Oct. 1, 1935.  S. D. MITEREFF  2,015,861
CONTROL DEVICE
Filed July 6, 1934   3 Sheets-Sheet 2
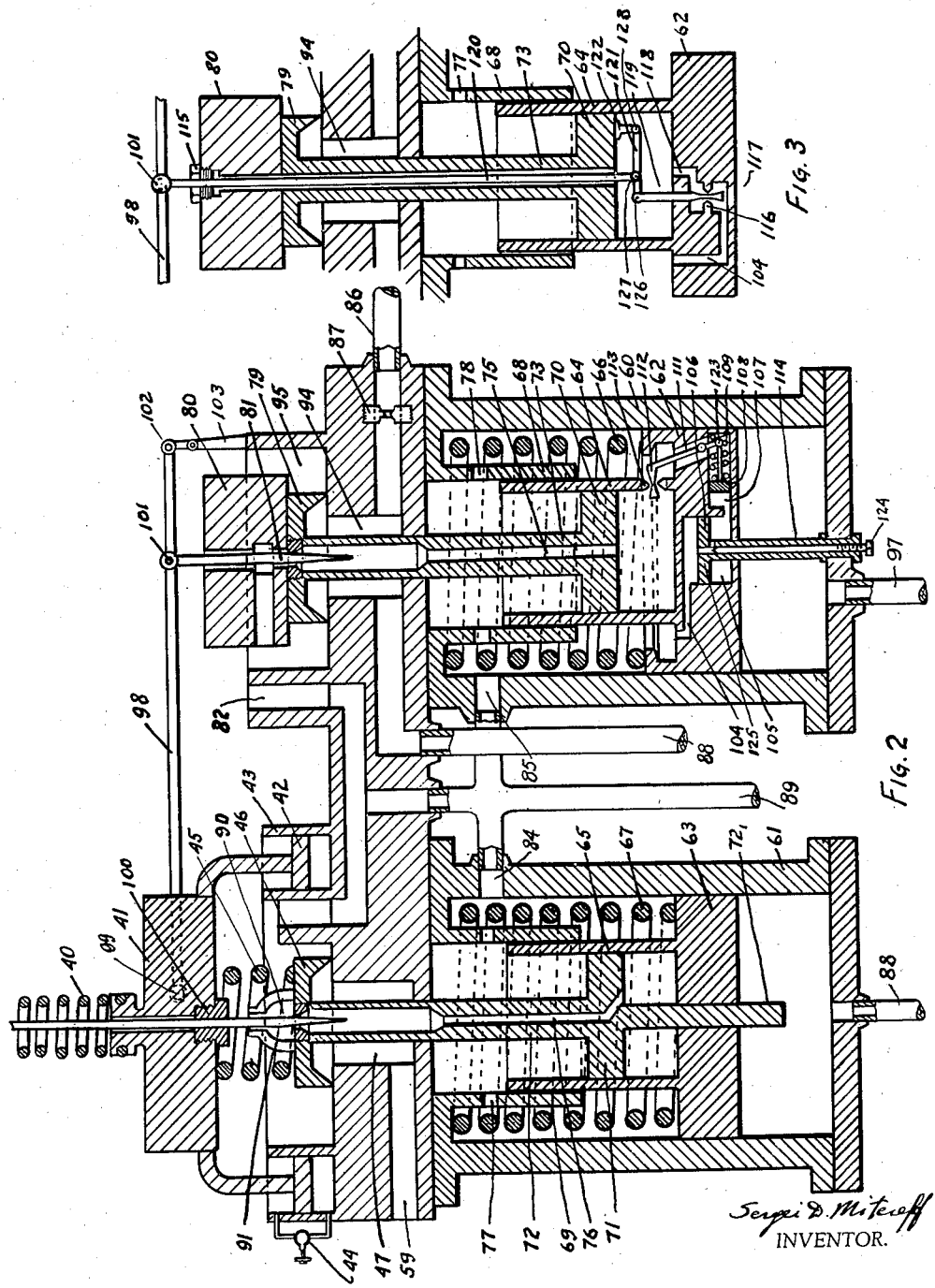

Patented Oct. 1, 1935

2,015,861

UNITED STATES PATENT OFFICE 2,015,861

CONTROL DEVICE

Sergei D. Mitereff, Petersburg, Va.

Application July 6, 1934, Serial No. 733,962

3 Claims. (Cl. 137—158)

In the U. S. patent application Serial No. 509,458 filed January 17, 1931, I have disclosed new method of automatic regulation. These methods consist mainly in counteracting the variation of the controlled function (pressure, temperature, speed, etc.) by actuating the regulating means proper (a valve, for example) by an automatic regulator responsive not only to the extent of the variation of the function but also to the rate of change of the function or else to both the rate of change and the rate of the rate of change of the function.

The device specifically illustrated in the above referred to application for producing the effect which is proportional to the rate of change of the function consists of a spring loaded diaphragm moving the piston of a dash pot and thus creating a pressure (or vacuum) of the liquid filling the dash pot which is proportional to the rate of change of the function.

The present invention concerns the preferred means by which the method of the automatic regulation disclosed in the above referred to application can be most conveniently applied to the existing speed governors. For this purpose two of the well known speed governors were selected. One of these governors is used primarily for the control of the speed of the steam turbines whereas the second governor is used primarily for the control of the speed of the water-wheels.

The accompanying drawings illustrate these governors together with the attached preferred means which make these governors perform in accordance with the methods disclosed by me in the U. S. patent application Serial No. 509,458 entitled "Automatic regulators and methods."

In these drawings like characters of reference indicate like parts in the several views, and:

Fig. 2 is the enlarged view of these means provided with the alternate devices for their automatic adjustment.

Fig. 3 is the enlarged view of still another device for the automatic adjustment of these means.

Figure 1:
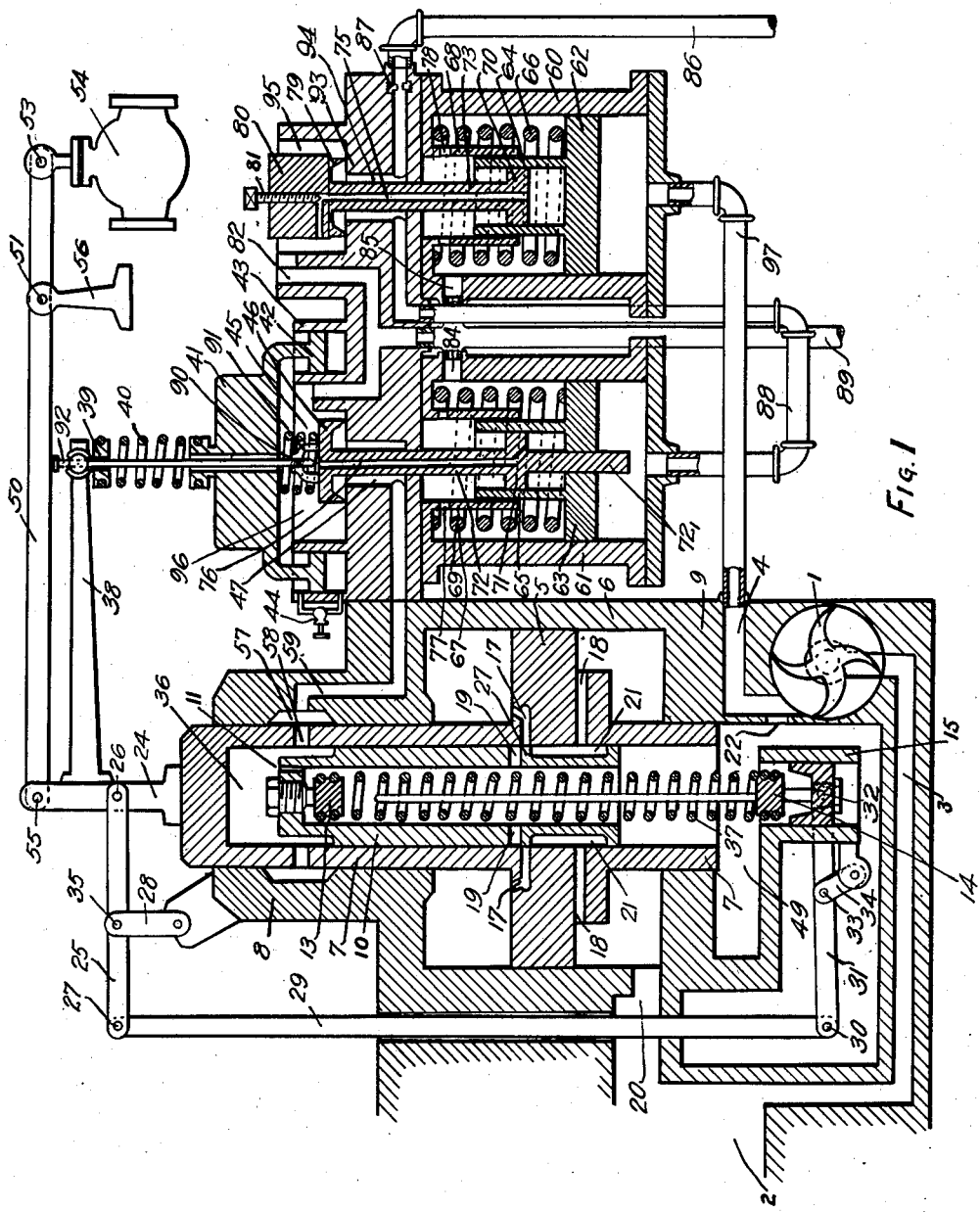
Fig. 1 is the cross sectional view of the steam turbine speed governor and the means which constitute the subject matter of this invention.

The turbine governor shown in the Fig. 1 and its operation will now be described.

The impeller 1 of a small centrifugal pump is driven by the turbine being either keyed to the turbine's shaft or geared to it.

The inlet of the pump is connected by the passage 3 with the suction reservoir 2 filled with oil and open to the atmosphere.

The outlet of this pump is communicating with the space 49 by the passage 22.

The oil pressure in the space 49 varies therefore approximately as the speed of the turbine.

The operating piston 5 of the governor slides in the cylinder 6. The piston 5 carries a hollow rod 7. The upper end of the rod 7 is closed and it protrudes through the upper cover 8 of the cylinder 6.

The lower end of the rod 7 is open and it protrudes through the lower cover 9 of the cylinder 6.

Inside the hollow space of the rod 7 fits slidably the hollow cylindrical pilot valve 10. The upper end of the valve 10 is closed except for the orifice 11. The pilot valve 10 is being pulled downward by the tension spring 37 attached to the plug 13 fastened to the upper end of the pilot valve 10. The lower end of the spring 37 is attached to the plug 14 sliding in the cylindrical slide 15.

The space beneath the piston 5 is connected with the reservoir 2 by means of the passage 20. This space is therefore under the atmospheric pressure. The pilot valve 10 has ports 19 communicating the space inside of it with its outside surface and it has also the port 21 formed by the reduced diameter portion of the valve near its lower end. The ports 19 and 21 are separated by the partition 27.

The piston 5 has ports 17 communicating the space above it with the inside surface of the rod 7. This port is covered by the partition 27 when the governor is at the stand-still. The piston 5 has also ports 18 communicating the space below the piston 5 with the inside surface of the rod 7 opposite the port 21. In this way the port 21 is always in communication with the reservoir 2 and is subjected therefore only to the atmospheric pressure. Since the space inside the pilot valve 10 is communicating with the space 49 the ports 19 are always subjected to the oil pressure at the outlet of the pump impeller 1.

The piston rod 7 carries on the top of it the fulcrum support 24. The plug 14 is connected with the support 24 by means of the leverage system consisting of the levers 31, 29, and 25. The right hand end 32 of the lever 31 is fulcrumed at the plug 14, whereas its left hand end 30 is hinged to the lower end of the lever 29. The right hand end 26 of the lever 25 is fulcrumed at the fulcrum support 24 while its left hand end 27 is hinged to the upper end of the lever 29. Approximately the middle point 33 of the lever 31 is hinged to the link 34 supported by the slide 15. Approximately the middle point 35 of the lever 25 is hinged to the link 28 supported by the upper cover of the cylinder 6. The length of the lever 31 between points 32 and 33 is shorter than the length of the lever 31 between points 30 and 33. The length of the lever 25 between points 26 and 35 is longer than its length between points 27 and 35. It will be clear from the examination of the leverage system connecting the support 24 and the plug 14 that the upward and downward movement of the piston 5 results in the upward and downward movement of the plug 14. Due to the unequal leverage, the distance traversed by the plug 14 is smaller than the corresponding distance traversed by the piston 5.

The pressure of the oil in the space 36 above the pilot valve 10 is maintained to be considerably lower than is the oil pressure in the space 49 below the pilot valve 10 by the arrangement to be explained later.

The parts of the governor so far described operate as follows: Assuming that the pressure in the space 36 is constant, the variations in the oil pressure in the space 49 are balanced by the tension of the spring 37 in so far as these variations affect the pilot valve 10. It follows therefore that as the turbine speed changes, the pressure in the space 49 changes also in proportion to the change of the turbine speed and this in turn results in the proportional movement of the valve 10. As the pilot valve moves upward or downward the operating piston 5 moves with it. This is due to the fact that a very small relative displacement between the valve 10 and the piston 5 results in the ports 17 communicating with either ports 19 or the port 21.

More specifically if the pilot valve 10 moves upward, the ports 17 are brought in communication with the port 21, the pressure is relieved from the upper side of the piston 5 and the oil pressure acting on the piston rod 7 makes the piston 5 move upward. Likewise if the pilot valve 10 moves downward, the ports 17 are brought in communication with the ports 19 and the oil pressure is admitted to the upper side of the piston 5. Since the area of the piston 5 is greater than the area of the rod 7, the oil pressure acting on the top of the piston 5 makes it move downward.

As the piston 5 moves upward or downward, the plug 14 is moved also upward or downward with it due to the operation of the leverage 25, 29, and 31. It was explained before that the movement of the plug 14 is smaller in the extent than is the movement of the piston 5. Since the net change in the length of the spring 37 with the change of turbine speed remains the same, the movement of the plug 14 results in the additional travel of the pilot valve 10 and consequently in the additional travel of the piston 5.

This additional travel of the piston 5 is also proportional to the change of the turbine speed. It is apparent therefore that the effect of the leverage 25, 29, and 31 is to decrease the effective stiffness of the spring 37. In other words, in order to produce the same travel of the piston 5 for a given change of the turbine speed the spring 37 should have been much longer if this leverage did not exist.

The rest of the governor will now be described. At the top of the support 24 is fulcrumed the left hand end 55 of the lever 50. The right hand end of this lever is hinged to the stem 53 of the throttle valve 54 admitting steam to the turbine. The point 51 of the lever 50 is fulcrumed at the fixed support 56. It is evident from this description that the upward movement of the operating piston 5 results in closing movement of the throttle valve 54 while the downward movement of the piston 5 results in opening movement of the valve 54.

The fulcrum support 24 carries an arm 38. From the right hand end of the arm 38 is suspended the plug 39 to which is attached the upper end of the tension spring 40. The lower end of the spring 40 is attached to the weight 41. The weight 41 is provided with the annular piston 42 sliding in the annular cylinder 43. The needle valve 44 controls the flow of liquid filling the cylinder 43 between the space above and below the piston 42. The weight 41 is bearing upon the compression spring 45 which rests upon the cup bleeder valve 46. The valve 46 covers the port 47 which communicates with the annular space 57 by the passage 59. The annular port 57 communicates with the space 36 above the pilot valve 10 by the ports 58.

The oil passing through the orifice 11 is constantly escaping from under the cup bleeder valve 46. The oil pressure on the top of the pilot valve 10 is proportional therefore to the pressure exerted by the spring 45 upon the cup bleeder valve 46.

In order to facilitate the explanation of the operation of the parts of the governor just described an elementary case will be assumed, namely that when the speed of the turbine increases suddenly a certain amount and then stays constant at this new value. The first thing happening in such a case will be that the pilot valve 10 and therefore also the piston 5 will move upward just as suddenly a distance proportional to this sudden change of the turbine speed.

The upward movement of the piston 5 will extend the spring 40 an equal amount. Since now the pull of the spring 40 is greater than the difference between the weight of the weight 41 and the push of the spring 45, the next thing happening will be a gradual upward movement of the weight 41 resisted by the oil filling the cylinder 43. This slow upward movement of the weight 41 will cause an equally slow reduction of the oil pressure in the space 36 above the pilot valve 10.

This reduction in oil pressure will result in turn in gradual upward movement of the piston 5 and gradual extension of the spring 40. If the springs 40 and 45 are so selected as to make the distance traversed by the piston 5 greater than the corresponding distance traversed by the weight 41 by the amount sufficient to compensate the reduced compression of the spring 45, this subsequent slow upward movement of the piston 5 will continue as long as the increase of the turbine speed persists.

Moreover the speed of this slow movement will be proportional to this permanent change of the turbine speed. This is due to the fact that the speed of the movement of the weight 41 is proportional to the net lifting force acting upon it and equal to the resistance of the fluid filling the cylinder 43.

However, if the movement of the weight 41 results in only an equal or smaller movement of the piston 5, this slow subsequent movement of the piston 5 will gradually subside and the piston 5 will come to rest even though the turbine speed is above the normal.

If the turbine speed drops instead of rising the piston 5 will move downwards in the similar manner.

For the sake of definiteness it is advisable to express mathematically the relationship between the change of the turbine speed and the resulting movement of the valve 54.

Adapting the following notations:

P—the extent of deviation of the turbine speed from its normal desired value as measured at the moment under consideration.

F—the distance between the position of the valve 54 at the same moment and its position at the beginning of operation of the governor when the turbine speed was held constant at its normal value.

$k_1, k_2, k_3, k_4, k_5, k_6, k_7, k_{13}, k_{14}, k_{15}, k_{16}, k_{17}, k_{18}$— the arbitrary constants of adjustment.

T—time.

d—sign of differential.

∫—sign of integral.

It could be shown that the characteristic of the governor as described so far could be expressed in the above notations as follows:

$$k_3 \int_{T_1}^{T_2} FdT + F = k_1 \int_{T_1}^{T_2} PdT + k_2 P \quad (1)$$

It should be pointed out that by the proper selection of the springs 40 and 45 the value of the constant of adjustment $k_3$ could be reduced to zero. In this particular case the Equation (1) is simplified to:

$$F = k_1 \int_{T_1}^{T_2} PdT + k_2 P \quad (2)$$

The Equation (2) expresses the characteristic of the governor corresponding to such adjustment that when the turbine speed changes a certain amount and then remains constant at this new value the piston 5 will continue to move as long as the speed change exists.

On the other hand the Equation (1) expresses the characteristic of the governor corresponding to such an adjustment that when the turbine speed changes a certain amount and then remains constant at this new value, the piston 5 will gradually come to a standstill in spite of the fact that the speed of the turbine is still above or below its normal value. In this way a slightly lower speed is maintained with piston 5 in its lower position than when it is at its upper position.

Since the lower position of the piston 5 corresponds to the open throttle valve 54 it means that a slightly lower speed is maintained at full load of the turbine than at the partial load. This effect is necessary to make possible the proper division of the load between several turbines runing in parallel.

The Equation (2) expresses the characteristic of the governor with such an adjustment that exactly the same speed is maintained irrespective of the load of the turbine.

The attachment to the standard turbine speed governor just described which constitute the subject matter of this invention will now be described.

This attachment consists essentially of the two cylinders 60 and 61 in which are fitted slidably the piston 62 and the piston 63. The piston 62 is loaded by the tension spring 66 whereas the piston 63 is loaded by the compression spring 67.

The piston 62 carries a small cylinder 64 in which fits the piston 70. The piston 70 is attached by the rod 73 to the cup bleeder valve 79 resting upon the seat 93 and covering the port 94. The cup bleeder valve 79 is loaded by the weight 80.

The piston 63 carries a small cylinder 65 in which fits the piston 71. The piston 71 is attached by the rod 72 to the cup bleeder valve 46 belonging to the governor already described. The piston 71 is carrying also the extension rod 72, protruding through a closely fitting hole in the piston 63.

The cylinder 64 fits slidably in the cylindrical guide 68 provided with hole 78 communicating the space above the piston 70 with the space 95 around the cup bleeder valve 79.

The cylinder 65 fits slidably in the cylindrical guide 69 provided with the holes 77 communicating the space above the piston 71 with the space above the piston 63.

The rod 73 is provided with the passage 75 communicating the space underneath the piston 70 with the space 95 surrounding the cup bleeder valve 79. This passage can be restricted to any desired extent by the needle valve 81. The space 95 is drained by the duct 82 communicating with the drain pipe 89.

The port 94 is supplied with oil under pressure flowing from a source of the constant oil pressure through the pipe 86 and the orifice 87. The port 94 is communicated with the underside of the piston 63 by the pipe 88. The space above the piston 62 is subjected to oil pressure in space 4 being connected to it by the pipe 97. The space above the piston 63 is drained through the hole 84 communicating with the drain pipe 89.

The underside of the piston 62 is drained through the pipe 85.

The oil pressure in the space 4 is proportional to the speed of rotation of the impeller 1 and is therefore proportional to the speed of the turbine.

The rod 72 is provided with the passage 76 communicating the space beneath the piston 71 with the space 96 surrounding the cup bleeder valve 46. The passage 76 can be restricted to any desired extent by the needle valve 90 whose stem has the thread fitting into the threaded hole of the yoke 91 carried by the cup bleeder valve 46. The stem 92 of the valve 90 is protruding through the hole in the plug 39 and it could be turned by hand.

The attachment just described operates as follows. As the speed of the turbine changes, the oil pressure above the piston 62 changes in proportion. Since the under side of the piston 62 is exposed only to the atmospheric pressure, the change of the oil pressure above the piston 62 is balanced by the force of the spring 66. Since the force exerted by the spring is proportional to its deformation the change of the turbine speed results in a proportional upward or downward movement of the piston 62.

The movement of the piston 62 produces the proportional displacement of oil between the space beneath the piston 70 and the space 95. It follows therefore that the speed of the oil flow through the opening of the valve 81 is proportional to the rate of change of the turbine speed. Since the pressure drop through a partially closed valve is proportional to the speed of fluid flow through it, it means that the pressure or vacuum is created under the piston 70 by the movement of the piston 62 and that moreover this pressure or vacuum is proportional to the rate of change of the turbine speed.

The oil passing through the orifice 87 constantly escapes from under the cup bleeder valve 79. The pressure of the oil in the port 94 is proportional therefore to the downward force acting upon the bleeder valve 79. This downward force is equal to the difference between the weight of the weight 80 and the force exerted by the pressure or vacuum of the oil under the piston 70. Since the pressure or vacuum under the piston 70 is proportional to the rate of change of the turbine speed it means that the pressure under the cup bleeder valve 79 varies as the rate of change of the turbine speed.

It should be mentioned here that the piston 62 is made purposely so large and the valve 81 is open so wide that the relatively small pressure variations under the piston 70 have practically no restraining effect upon the motion of the piston 62.

The piston 63 acted upon by the pressure under the cup bleeder valve 79 moves in proportion to the variation of this pressure. The movement of the piston 63 creates the pressure or vacuum under the piston 71 which is proportional to the rate of change of the pressure under the cup bleeder valve 79.

Since the variations of the pressure under the cup bleeder valve 79 is proportional to the rate of change of the turbine speed the variation of the pressure under the piston 71 is proportional to the rate of the rate of change of the turbine speed.

It should be mentioned that in this case also the piston 63 is made so large and the valve 90 open so wide that the relatively small variations in the pressure under the piston 71 have no restraining effect upon the movement of the piston 63.

The oil pressure under the piston 63 acts directly upon the extension stem 72, and produces force upon it which varies in proportion to the rate of change of the turbine speed.

The total force acting upon the stem 74 varies therefore as the sum of the rate of change of the turbine speed plus the rate of the rate of change of the turbine speed.

Designating this force as N we may write therefore:

$$N = k_{13}\frac{dP}{dT} + k_{14}\frac{d^2P}{dT^2} \quad (3)$$

Where the constant of adjustment $k_{13}$ depends upon the opening of the valve 81 and the constant of adjustment $k_{14}$ depends upon the opening of the valve 90.

The expression $$\frac{d^2P}{dT^2}$$

could be rewritten as $$\frac{d}{dT}\left(\frac{dP}{dT}\right)$$

and it means the rate of the rate of change of the speed of the turbine P.

The variations in the force acting upon the stem 74 result in proportional variation of the oil pressure under the cup bleeder valve 46 and therefore also of the pressure on the top of the pilot valve 10.

So far as the operation of the governor is concerned the variation of the pressure on the top of the pilot valve 10 is equivalent to the similar variation of the pressure beneath the pilot valve 10 with the exception of the direction of this variation.

In other words if the oil pressure on the top of the pilot valve is increased by say 5 pounds per square inch, the effect of this increase on the movement of the governor will be exactly the same as the 5 pounds per square inch decrease of pressure beneath the pilot valve 10.

It could be shown that the characteristic of the governor just described and including the attachment, constituting the subject matter of this invention, can be expressed in the previous notations as follows:

$$k_3\int_{T_1}^{T_2} FdT + F = k_1\int_{T_1}^{T_2} PdT + k_2P + k_4\frac{dP}{dT} + k_5\frac{d^2P}{dT^2} \quad (4)$$

The Equation (4) expresses the characteristic of the governor with the attachment in operation and when the governor is adjusted for the dropping speed effect with the increase of the turbine load.

By adjusting the governor to maintain the same speed regardless of the load, the characteristic of the governor with attachment in operation becomes:

$$F = k_1\int_{T_1}^{T_2} PdT + k_2P + k_4\frac{dP}{dT} + k_5\frac{d^2P}{dT^2} \quad (5)$$

In the embodiment of the invention shown on Fig. 1 the adjustment of the constants $k_4$ and $k_5$ is effected by turning by hand the stems of the valves 81 and 90.

Several alternate automatic adjustments of the constants $k_4$ and $k_5$ are shown on Fig. 2 and Fig. 3.

In order to effect the automatic adjustment of the constant $k_5$ the thread of the needle valve 90 is fitted into the threaded hole of the plug 100 attached to the weight 41, and it passes freely through the yoke 91. The position of the weight 41 depends upon the load carried by the turbine. More specifically the closed throttle valve 54 with no load on the turbine corresponds to the highest position of the weight 41 whereas the fully open throttle valve with full load on the turbine corresponds to the lowest position of the weight 41. Since the valve 90 is opening with the upward movement of the weight 41 and is closing with the downward movement of the valve 90, the resistance of the valve 90 to the flow of oil through it is the lowest at the no load condition and is at the highest at full load condition. The value of $k_5$ is directly proportional to the resistance of the valve 90 and is therefore proportional to the load carried by the turbine.

The adjustment of the constant $k_4$ in proportion to the load is effected by the lever 98 operating the valve 81. The left hand end 99 of the lever 98 is attached to the weight 41 whereas its right hand end is attached to the support 103. The intermediate point 101 of the lever 98 actuates the valve 81. In this way the resistance of the valve 81 is increased with the increase of turbine load and is decreased with the decrease of the turbine load.

Another alternate adjustment of the constant $k_4$ is provided by means of the double pointed needle valve 112. This valve moves in accordance with the movement of the piston 108 loaded by the tension-compression spring 123. The movement of the piston 108 is transmitted to the valve 112 through the lever 111.

The left hand side of the piston 108 is exposed to the oil pressure under the stationary piston 106.

The piston 106 is supported by the rod 114 inside of which is fitted the needle valve 124. The needle valve 124 controls the opening of the passage 125 communicating the space above the piston 106 with the space below the piston 106. The space above the piston 106 is communicating with the space above the cylinder 64 by means of the passage 104. The area of the piston 108 is very small compared with the area of the piston 106. The oil pressure or vacuum under the piston 106 is proportional to the speed of the piston 62 and is therefore proportional to the rate of change of the speed of the turbine. Due to the operation of the spring 109, the extent of movement of the piston 108 is proportional to the rate of change of the turbine speed. The valve 112 is moving toward its closed position in proportion to the rate of change of the turbine speed irrespective of whether the speed is increasing or decreasing, and also irrespective of the actual value of the speed of the turbine. Just how much the valve 112 is closed for a given value of the rate of change of the turbine speed is determined by the position of the valve 124 which could be adjusted by hand from the outside.

It will be clear to those skilled in the art that the similar adjustment of the valve 90 could be built into the piston 63.

Still another alternate automatic adjustment of the constant $k_4$ is shown in Fig. 3. This adjustment is effected by the valve 117 partially closing the orifice 116 connecting duct 118 which communicates with the space under the piston 70 with the duct 104 communicating with the space above the cylinder 64.

The double pointed needle valve 117 is actuated by the point 126 of the lever 121. The opposite end 128 of the lever 121 is supported by the support 122. The intermediate point 127 of the lever 121 is actuated by the rod 120 attached at its upper end to the lever 98.

It will be clear from the examination of the leverage system actuating the valve 117 that the net travel of the valve 117 in respect to the orifice 116 is proportional to the difference between the travel of the piston 62 and the travel of the weight 41.

The travel of the piston 62 is proportional to the change of the speed of the turbine. The travel of the weight 41 is proportional to the change of the turbine load. If the governor is adjusted for the dropping speed characteristic, for every value of the turbine load there exists a definite speed proper for this load.

The leverage actuating the valve 117 is so proportioned that when the turbine speed is at its correct value for the existing load the valve 117 is in its middle position in respect to the orifice 116. Conversely any deviation of the speed from its normal value for the existing load will cause a proportional partial closing of the valve 117. Therefore the automatic adjustment shown on Fig. 3 increases the constant $k_4$ in proportion to the deviation of the turbine speed from its normal value for the existing load on the turbine.

Another embodiment of my invention particularly adapted to be used in connection with a well known hydraulic turbine governor will now be described.

This governor comprises the flyballs 129 suspended by the rods 148 from the yokes 131. The yokes 131 are attached to the sleeve 134. The sleeve 134 is rotated by the gear 135 attached to its lower end and meshing with the gear 136. The gear 136 is keyed to the shaft 137 rotated by the pulley 138 driven by a belt from the turbine shaft. The sleeve 134 is supported by the thrust bearing 149 and is guided by the ball bearing 142 interposed between the sleeve 134 and the stationary guide sleeve 141 fixed in the pedestal support 145 by the set screw 144.

Rods 148 have arms 132 formed at their upper ends bearing upon the spool 133 fitted slidably into the sleeve 134.

The spool 133 is bearing upon the push rod 140 through the intermediary of the thrust ball bearing 139.

The push rod 140 is supported by the compression spring 146 resting upon the nut 150.

It will be seen from this description that the centrifugal force acting on the flyballs 129 is balanced by the compressive force of the spring 146. Since the force of a spring is proportional to its deformation, the downward movement of the rod 140 is proportional to the centrifugal force acting on the flyballs 129 and is proportional therefore to the speed of the turbine.

The lower end 151 of the rod 140 is attached to the right hand end of the floating lever 152. The left hand end 154 of the lever 152 is attached to the rod 158 actuated by the plunger 159. The plunger 159 is centered by means of the tension-compression spring 160.

The intermediate point 153 of the lever 152 is attached to the rod 154 actuating the cylindrical pilot valve 155. The valve 155 controls the flow of oil under pressure supplied through the pipe 156 to and from the piston 158. It will be seen from the arrangement of the pilot valve 155 that the downward movement of the valve 155 results in the movement of the piston 158 to the left whereas the upward movement of the valve 155 results in the piston 158 moving to the right. The movement of the piston 158 is transmitted to the plunger 167 by means of the piston rod 161 bell crank 162, rod 163, lever 164 and the rod 166. In this way when the piston 158 moves to the left it pushes the plunger 167 downward and when the piston 158 moves to the right it pulls the plunger 167 upward.

The plungers 159 and 167 are sliding through the closely fitting holes made in the partition 169 dividing the reservoir 170 into upper and lower chambers. The reservoir 170 is partially filled with oil or other viscous liquid. The upper and lower chambers of the reservoir 170 are communicated by the orifice 171 made in the partition 169. The orifice 171 is partially closed by the needle valve 168. The parts of the governor so far described operate as follows: As the turbine speed changes the point 151 of the rod 140 is moving up or down. Since the spring 160 serves for the time being as the fixed support for the lever 152, the movement of the point 151 results in the proportional up or down movement of the rod 154 and of the pilot valve 155 attached to it. It requires, however, a very small displacement of the valve 155 to produce a violent movement of the piston 158. As the piston 158 moves it causes the proportional displacement of the plunger 167. Assuming for the moment that the valve 168 is closed tight, the displacement of the plunger 167 results in the proportional displacement of the plunger 159, oil filling the lower part of the reservoir 170 acting as the connecting link between the plunger 167 and the plunger 159. The movement of the plunger 159 is transmitted to the left hand end 154 of the lever 152. It will be seen from the examination of the leverage system involved that the downward movement of the point 151 results in the piston 158 moving to the left which in turn results in the downward movement of the plunger 167 and the upward movement of the plunger 159.

Likewise the upward movement of the point 151 results in the piston 158 moving to the right, plunger 167 moving upward and the plunger 159 moving downward. In this way the downward or upward movement of the point 153 due to the downward or upward movement of the point 151 respectively is counterbalanced by the resulting upward or downward movement respectively of the point 154.

Therefore the point 153 remains practically stationary while the displacement of the point 151 is followed by the proportional displacement of the plunger 159.

Since the position of the point 151 depends upon the speed of the turbine it follows that the movement of the point 154 proceeds in unison with the change of the turbine speed.

This part of the governor is so adjusted that when the turbine speed is at its normal desired value the point 154 is in such a position as to make the spring 160 free either from the tension or compression.

Any deviation of the turbine speed from the normal results in the proportional to this deviation movement of the point 154. Since the force exerted by a spring is proportional to its deformation a given deviation of the speed of the turbine from the normal results in upward or downward force of the spring 160 applied to the plunger 159, this force being proportional to the deviation of the turbine speed from its desired normal value.

Since the plunger 159 is bearing upon the oil in the lower part of the reservoir 170, the pressure or vacuum in this part of the reservoir 170 is proportional to the deviation of the turbine speed from its normal value.

It is a well known fact that the speed of flow of a viscous fluid through an orifice is proportional to the difference of pressure existing across this orifice. Since the upper part of the reservoir 170 is subjected only to the atmospheric pressure, the speed of the flow of oil through the orifice 171 is proportional to the deviation of the turbine speed from the normal, provided that the valve 168 is partially open. With the point 151 stationary the point 154 cannot move without producing the movement of the piston 158.

Therefore the flow of oil through the orifice 171 results in plunger 167 moving with the speed proportional to the speed of the oil flow and therefore proportional also to the deviation of the turbine speed from the normal.

The total movement of the plunger 167 consists therefore of two parts,—the first part is due and is proportional in the extent to the extent of the movement of the plunger 159 while the second part is due to the flow of oil through the orifice 171 and this second part is proceeding with the speed proportional to the extent of movement of the plunger 159.

The extent of the movement of the plunger 159 is proportional to the change of the turbine speed while the extent of the movement of the plunger 167 is proportional to the movement of the piston 158.

It follows therefore that the movement of the piston 158 consists of two components. One component is proportional in its extent to the deviation of the turbine speed from its normal value while the second component proceeds with the speed proportional to the deviation of the turbine speed from its normal value.

These two components are additive in making the total movement of the piston 158.

The rest of the governor will now be described. The point 172 of the bellcrank 162 actuates the pilot valve 186 by means of the rod 173, floating lever 175, link 178 and the floating lever 180. The pilot valve 186 controls the movement of the operating piston 187. The movement of the piston 187 is transmitted to the point 182 of the floating lever 180 by means of the piston rod 188, the bellcrank 185 and the link 183.

Assuming that the point 177 of the lever 175 is stationary, the downward movement of the point 172 of the bellcrank 162 will result in the downward movement of the pilot valve 186.

As soon as the pilot valve 186 moves downward a very small distance the oil under pressure is admitted from the supply pipe 194 to the left hand side of the piston 187 while the outlet pipe 195 is communicated with the right hand side of the piston 187.

The oil pressure acting upon the piston 187 makes it move to the right. The point 182 of the lever 180 is moved downward by the piston 187 with the result that the pilot valve 186 is moved upward into its neutral position. If the point 172 moves upward the movement of the piston 187 and the rest of the leverage will be in the opposite direction.

It will be seen therefore that the pilot valve 186 is always practically stationary and that the upward or downward movement of the point 174 of the floating lever 180 is compensated by the proportional downward and upward movement respectively of the point 182. Since the movement of the piston 187 is proportional to the movement of the point 182, it means that the movement of the piston 187 is proportional to the movement of the point 174 and is therefore proportional to the movement of the piston 158 provided that the point 177 of the lever 175 is stationary. The movement of the piston 187 is transmitted to the throttle valve 190 by means of the rod 188 and the bellcrank 189.

It is evident that the movement of the throttle valve 190 is proportional to the movement of the piston 158.

Preserving the notations used in previous equations, with the exception that the letter F stands now for the distance traversed by the valve 190, the characteristic of the governor described so far can be expressed as:

$$F = k_1 \int_{T_1}^{T_2} P \, dT + k_2 P \qquad (6)$$

The Equation (6) represents the characteristic of this well known hydraulic turbine governor when it is not equipped with an "equalizer". It will be seen by comparing the Equation (6) with the Equation (2) that the characteristic of this hydraulic governor without "equalizer" is identical with the characteristic of the steam turbine governor shown on Fig. 1 when it is adjusted for the "flat" speed characteristic. In both governors the effect of the attachments constituting the subject matter of this invention on the characteristic of these governors is not taken into account in either the Equation (6) or the Equation (2). The "equalizer" and its operation will now be described. The equalizer consists of the excentric 193 mounted rotatively upon the pin 194 carried by the bracket 195. The point 199' of the lever 196 is bearing upon the excentric 193. The right hand end 197 of the lever 196 is pivoted at the bracket 200 while its left hand end 198 is supporting the plug 199 on the top end of which is screwed on the nut 150 mentioned previously.

As the excentric 193 is rotated it moves up or down the point 198 of the lever 196 and moves thus up or down the plug 199 and the nut 150. Since the nut 150 acts as the support for the spring 146, the upward movement of the nut 150 results in a greater compressive force of the spring 146. Therefore if the rod 140 is to remain stationary the speed of the turbine must increase an amount proportional to the upward movement of the point 198.

Conversely if the speed remains the same, the upward movement of the point 198 will result in an equal upward movement of the rod 140 and the rest of the governor will act as though the speed decreased by the amount proportional to the movement of the point 198.

The excentric 193 is actuated by the rod 192 attached either to the throttle valve 190 or to the piston 158 through the intermediary of the extension rod 120, link 121 and the bell crank 122. Since the piston 158 and the throttle valve 190 move in unison, provided the point 177 of the lever 175 is stationary, it is immaterial whether the excentric 193 is being turned in accordance with the movement of the piston 158 or the throttle valve 190.

It will be understood that even though both of these alternate ways of actuating the excentric 193 are shown, only one of them is actually in operation.

The extent of movement of the plug 199 is proportional to the extent of movement of either the piston 158 or the valve 190.

It could be proven that the characteristic of this governor with two equalizers in operation can be expressed by the following equation in which the previous notations are used:

$$k_3 \int_{T_1}^{T_2} FdT + F = k_1 \int_{T_1}^{T_2} PdT + k_2 P \qquad (7)$$

By comparing the Equation (7) with the Equation (1) it will be seen that the characteristic of this hydraulic governor when provided with an equalizer is identical with the characteristic of the steam turbine governor previously described if that governor is adjusted for the dropping speed characteristic.

The attachment to this hydraulic turbine governor which constitutes the subject matter of this invention will now be described.

This attachment consists of the parts mounted upon the platform 201 and the cylinder assembly 202. Another part not strictly belonging to the standard form of the governor is the floating lever 175 because in the standard form of the governor the point 174 is attached directly to the point 179 of the floating lever 180.

The parts mounted upon the platform 201 comprise the cylinder 203 provided with the guide 204 protruding through a hole in the cover plate 205. Inside the cylinder 203 is fitted a piston 206 actuated by the lever 208 which in turn is actuated by the point 154 of the lever 152 by means of the rod 209. The lever 208 is fulcrumed at the point 207. In this way the upward movement of the point 154 results in the downward movement of the piston 206.

As was explained before the movement of the point 154 is proportional to the movement of the point 151 and is therefore proportional to the change of the turbine speed. It follows therefore that the movement of the piston 206 is also proportional to the change of the turbine speed. The cylinder 203 is supported by the cup bleeder valve 210. The cup bleeder valve 210 covers the port 211 supplied with oil under pressure from the pipe 213.

The oil is fed to the port 211 through the orifice 212. The pressure of the oil in the pipe 213 is sufficient to lift the cup bleeder valve 210 from its seat. It is evident therefore that the pressure of oil in the port 211 is proportional to the total downward force acting upon the valve 210. This downward force consists of the constant weight of the cylinder 203 and the pressure or vacuum existing under the piston 206.

The cylinder 203 is provided with the bypass 214 communicating the space above the piston 206 with the space below it. The flow of oil through this bypass is controlled by the needle valve 215.

Since the pressure drop through a valve is proportional to the speed of flow of the viscous fluid through it, the pressure or vacuum under the piston 206 is proportional to the speed of movement of the piston 206 and is proportional therefore to the rate of change of the turbine speed. It will be clear therefore that the oil pressure in the port 211 varies in proportion to the rate of change of the turbine speed.

Designating the variation of the oil pressure in the port 211 as "$N_1$" we may write therefore:

$$N_1 = k_{15} \frac{dP}{dT} \qquad (8)$$

Where: $k_{15}$ is the arbitrary constant of proportionality depending upon the opening of the valve 215. The oil pressure in the port 211 is transmitted through the duct 216 to the underside of the piston 218 sliding in the cylinder 217.

The piston 218 is loaded by the compression spring 219. Since the deformation of a spring is proportional to the force acting upon it, the piston 218 moves in proportion to the variation of the oil pressure in the port 211.

The movement of the piston 218 is transmitted to the piston 227 by means of the lever 220 pivoted at the point 221.

The piston 227 slides inside the cylinder 223. The cylinder 223 is provided with the slide 233 protruding through the hole in the cover plate 205.

The bypass 226 communicates the space below the piston 227 with the space above it. The flow of oil filling the cylinder 223 through the bypass 226 is controlled by the needle valve 227.

The cylinder 223 is supported by the cup bleeder valve 225 covering the port 228. The port 228 is supplied with oil under pressure through the pipe 230 in which is inserted the orifice 229.

The pressure in the pipe 230 is sufficient to lift the cup bleeder valve 225 from its seat. It is evident therefore that the pressure of the oil under the valve 225 is proportional to the total downward force acting upon the bleeder valve 225.

This force consists of the constant weight of the cylinder 223 and the pressure or vacuum existing under the piston 227.

Since the pressure drop through the valve 227' is proportional to the speed of the oil flow through it, the pressure or vacuum under the piston 227 is proportional to the speed of movement of the piston 227 and is proportional therefore to the rate of change of the pressure in the port 211. Since the pressure in the port 211 varies as the rate of change of the turbine speed, the pressure under the piston 227 varies as the rate of the rate of change of the turbine speed.

It should be pointed out that the piston 218 is purposely made so large and the spring 219 consequently so strong that the resistance of the oil in the cylinder 223 has practically no restraining effect upon the movement of the piston 218.

It will be seen from this explanation that the oil pressure in the port 228 varies in proportion to the rate of the rate of change of the turbine speed.

Designating the variation of pressure in the port 228 as "$N_2$" we may write:

$$N_2 = k_{16}\frac{d^2P}{dT^2} \qquad (9)$$

In the cylinder 202 is fitted slidably the piston 236 having the trunk portion 237 protruding through the hole in the partition 241. The space 235 under the piston 236 is communicated with the port 228 by means of the pipe 231.

The space 234 under the trunk 237 is communicated with the port 211 by means of the pipe 232.

The piston 236 is loaded by the spring 239. The space above the piston 236 is drained by means of the pipe 240.

The total upward pressure acting upon the piston 236 consists of the pressure in the port 211 and the pressure in the port 228. Since the deformation of the spring 239 is proportional to the total force acting upon it we may write for the distance traversed by the piston 236, designating this distance as "$F_3$":

$$F_3 = k_{17}N_1 + k_{18}N_2 \qquad (10)$$

Substituting the value of $N_1$ and $N_2$ from the Equations (8) and (9) into Equation (10) we get:

$$F_3 = k_{17}k_{15}\frac{dP}{dT} + k_{18}k_{16}\frac{d^2P}{dT^2} \qquad (11)$$

The movement of the piston 236 is transmitted to the point 177. The point 174 moves in proportion to the movement of the piston 158.

Therefore the distance traversed by the point 176 is equal to the additive combination of the distances traversed by the piston 236 and the distance traversed by the piston 158.

The distance traversed by the valve 190 is proportional on the other hand to the distance traversed by the point 176.

Taking the above facts into consideration it could be shown that the characteristic of the governor provided with the attachment constituting the subject matter of this invention is:

$$F = k_1 \int_{T_1}^{T_2} PdT + k_2P + k_4\frac{dP}{dT} + k_5\frac{d^2P}{dT^2} \qquad (12)$$

The Equation (12) expresses the characteristic of this hydraulic speed turbine governor when provided with the attachment constituting the subject matter of this invention and when the "equalizer" is not in operation.

By comparing the Equation (12) with the Equation (5) it will be seen that they are alike.

With both the attachment and the equalizer in operation the characteristic of this governor can be expressed as:

$$k_3\int_{T_1}^{T_2} FdT + F + k_6\frac{dF}{dT} + k_7\frac{d^2P}{dT^2} =$$
$$k_1\int_{T_1}^{T_2} PdT + k_2P + k_4\frac{dP}{dT} + k_5\frac{d^2P}{dT^2} \qquad (13)$$

Figure 4:
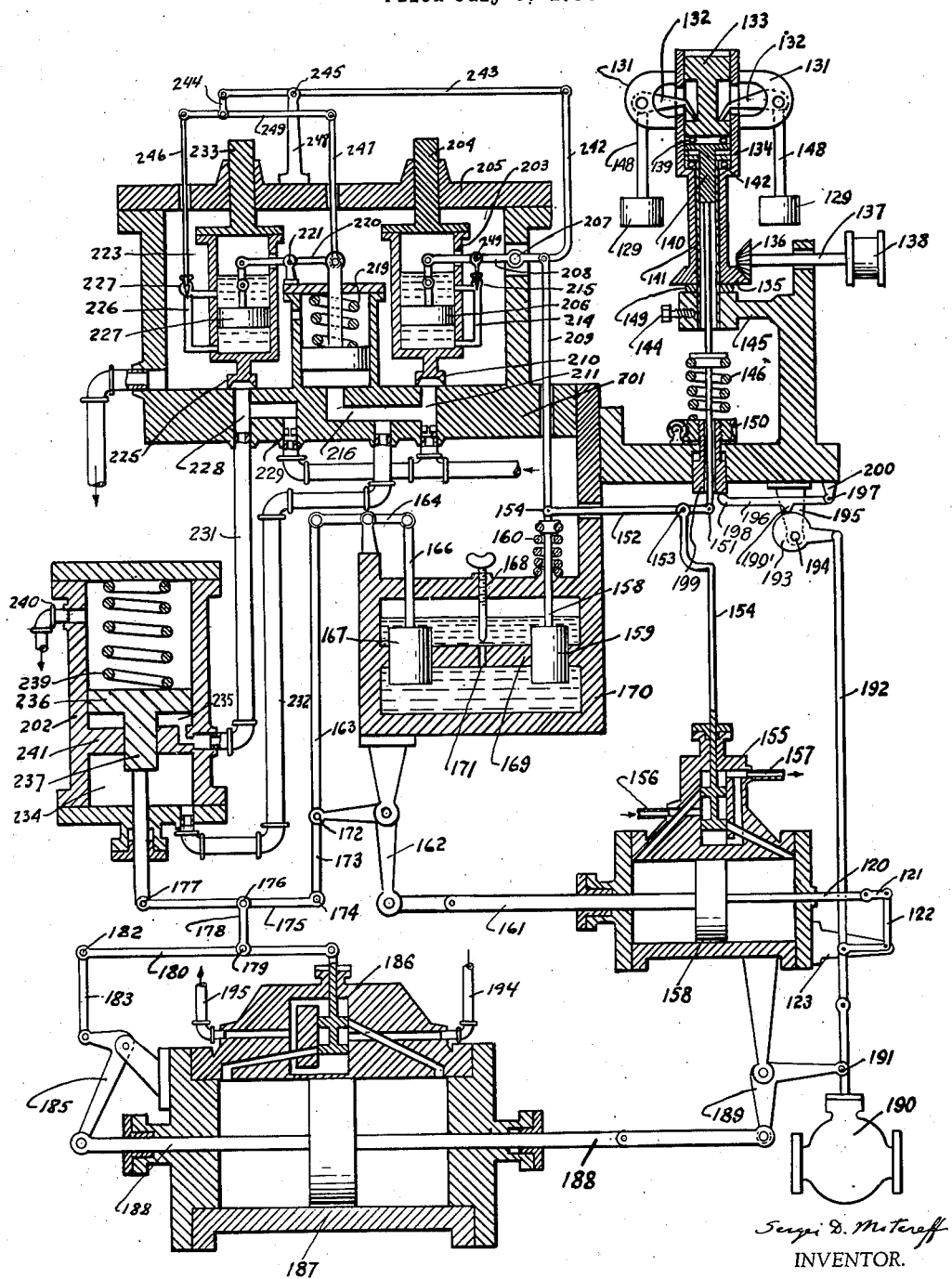
Fig. 4 is the cross sectional view of a hydraulic turbine speed governor and the means which constitute the subject matter of this invention.

In Fig. 4 some means for the automatic adjustment of the attachment are shown. The needle valve 215 is moved by the lever 208 through the pivot 249. Since the movement of the lever 208 is proportional to the change of the turbine speed, the degree of opening of the valve 215 is proportional to the change of the turbine speed. The degree of opening of the valve 215 affects on the other hand the value of the constant $k_4$ in the Equation (13).

The needle valve 227' is adjusted automatically in proportion to the algebraic sum of the movements of the plunger 159 and the piston 218. The movement of the plunger 159 is transmitted to the valve 227' by means of the rod 209, rod 242, lever 243, link 244, floating lever 249 and the rod 246.

The movement of the piston 218 is transmitted to the valve 227' through the rod 247, floating lever 249 and the rod 246.

Since the plunger 159 moves in proportion to the change of the turbine speed while the piston 218 moves in proportion to the rate of change of the turbine speed, the degree of opening of the valve 227' varies as the algebraic sum of the change of the turbine speed and the rate of change of the turbine speed.

It will be clear to those skilled in the art that even though I have specifically described the application of my invention to only two standard speed governors my invention could be easily applied to any existing governor.

It will be equally clear to those skilled in the art that the term $$k_5\frac{d^2P}{dT^2}$$

in the Equation (13) can be omitted by locking the piston 218 by a suitable locking device.

Likewise the term $$k_5\frac{d^2P}{dT^2}$$

in the Equations (4) and (5) can be eliminated by locking the piston 63 by a suitable locking device or else by installing a connection between pipes 97 and 88 and by closing pipe 88 by a valve in front of this connection.

The main advantage of this invention lies in the fact that the attachment to the governors here described enables the governors to respond to the change of the turbine speed in such a manner as to counteract the time lag between the electrical output of the turbine and flow of steam or water to the turbine due to the fluid friction and inertia of the steam or water in the supply connection as well as due to the sluggishness of the governor itself due to the inertia of its movable parts and the pressure drop of the oil in passing through the narrow passages.

I claim:

1. In a turbine speed governor consisting of a speed responsive element, a turbine throttle valve, a servomotor actuating said throttle valve, a pilot valve controlling the movement of the servomotor, and an operative connection between the above mentioned parts; an attachment consisting of: a cylinder filled with fluid, a piston mounted slidably inside said cylinder, a bypass between the space above and the space below said piston, a valve partially closing said bypass, means for moving the piston in relation to the cylinder in unison with and in proportion to the change of the turbine speed, a bleeder valve, a port covered by said bleeder valve, an orifice supplying fluid under pressure to the port, the pressure of the fluid being sufficiently high to lift said bleeder valve from its seat, means for loading said bleeder valve in unison with and in proportion to the pressure difference between the space above and the space below the piston generated by the movement of the piston relative to the cylinder, a second cylinder filled with fluid, a second piston mounted slidably inside the second cylinder, a bypass between the space above and the space below said second piston, a valve partially closing the last mentioned bypass, means for moving the second piston in relation to the second cylinder in unison with and in proportion to the change of the fluid pressure in the port covered by the above mentioned bleeder valve, a second bleeder valve, a port covered by said second bleeder valve, an orifice supplying fluid under pressure to the last mentioned port, the pressure of the fluid being sufficiently high to lift the second bleeder valve from its seat, means for loading the second bleeder valve in unison with and in proportion to the pressure difference between the space below and the space above said second piston generated by the movement of the second piston in relation to the second cylinder, means for combining additively and translating into an effect proportional to this additive combination of the pressure variation existing in the first mentioned port with the pressure variation existing in the second port, means for actuating the pilot valve in unison with and in proportion to the variation of said effect and without interfering with the actuation of the pilot valve by the ordinary operative connection of the governor, and means for actuating the valves partially closing the above mentioned bypasses in unison with and in proportion to the movement of a member of the operative connection of the governor.

2. In a turbine speed governor consisting of a speed responsive element, a turbine throttle valve, a servomotor actuating the throttle valve, a pilot valve controlling the movement of the servomotor, and an operative connection between the above mentioned parts; an attachment consisting of: a cylinder filled with fluid, a piston fitting slidably into said cylinder, a bypass between the space above and the space below said piston, a valve partially closing said bypass, means for moving the piston in relation to the cylinder in unison with and in proportion to the change of the turbine speed, a bleeder valve, a port covered by said bleeder valve, an orifice supplying fluid under pressure to said port, the pressure of fluid being sufficiently high to lift said bleeder valve from its seat, means for loading said bleeder valve in unison and in proportion to the variation of the pressure in the cylinder generated by the movement of the piston relative to the cylinder, means for actuating the pilot valve in unison and in proportion to the variation of the pressure in the port without interfering with the actuation of the pilot valve by the ordinary operative connection of the governor, and means for actuating the valve partially closing the bypass in unison with and in proportion to the movement of a member of the operative connection of the governor.

3. In a turbine speed governor consisting of a speed responsive element, a valve admitting fluid serving as a motive power for the turbine to the turbine, a servomotor actuating said valve, a pilot valve controlling the movement of the servomotor, and an operative connection between the above mentioned parts; a modification consisting of: a chamber filled with fluid, a partition dividing said chamber into two parts, an orifice in said partition communicating one part of the chamber with another, a valve partially closing said orifice, means for forcing fluid in the chamber through the orifice in a volume coincident with and proportional to the distance traversed by an operative member of the governor, means for translating the variation in pressure difference between two sides of the partition into a movement of the first mentioned valve coincident with and proportional to said pressure difference and without interfering with the movement of the valve produced by the ordinary operative connection of the governor, and means for actuating the valve partially closing the orifice in unison and in proportion to the movement of a member of the operative connection of the governor.

SERGEI D. MITEREFF.